United States Patent [19]
Otto

[11] Patent Number: 6,091,853
[45] Date of Patent: *Jul. 18, 2000

[54] LOCAL AREA LINEAR DYNAMIC RANGE COMPRESSION

[75] Inventor: Kurt J. Otto, Laguna Beach, Calif.

[73] Assignee: Lockhead Martin Corporation, Bethesda, Md.

[ * ] Notice: This patent issued on a continued prosecution application filed under 37 CFR 1.53(d), and is subject to the twenty year patent term provisions of 35 U.S.C. 154(a)(2).

[21] Appl. No.: 08/519,947

[22] Filed: Aug. 28, 1995

[51] Int. Cl.$^7$ ........................................... G06K 9/36
[52] U.S. Cl. ............................... 382/232; 382/169
[58] Field of Search .................... 382/169, 167, 382/232, 307; 345/147; 358/455, 458, 461

[56] References Cited

U.S. PATENT DOCUMENTS

| | | | |
|---|---|---|---|
| 4,998,209 | 3/1991 | Vuichard et al. | 348/673 |
| 5,016,110 | 5/1991 | Vuichard et al. | 348/347 |
| 5,063,607 | 11/1991 | FitzHenry et al. | 382/274 |
| 5,083,204 | 1/1992 | Heard et al. | 348/164 |
| 5,222,193 | 6/1993 | Brooks et al. | 395/23 |
| 5,249,241 | 9/1993 | Silverman et al. | 382/169 |
| 5,351,306 | 9/1994 | Finkler et al. | 382/169 |

*Primary Examiner*—Yon J. Couso
*Attorney, Agent, or Firm*—Kenneth W. Float

[57] ABSTRACT

A 12 bit to 8 bit dynamic range compression processor for compressing video data. The dynamic range compression processor uses a lookup RAM, or dynamic range compression RAM, to update offset and compression terms of each field of video in real time. During the active video period of each field, a 12 bit histogram of video pixel values is collected using a histogram RAM for a specific software defined local area of interest. During the video scan retrace time, the histogram is evaluated and offset and compression terms are computed based on upper and lower breakpoints of the histogram. An algorithm is employed to generate one of 3840 (15 integer and 3825 non-integer) compression slopes. Each compression slope is written into the dynamic range compression RAM starting at the computed offset value and is applied to the next field of video.

16 Claims, 4 Drawing Sheets

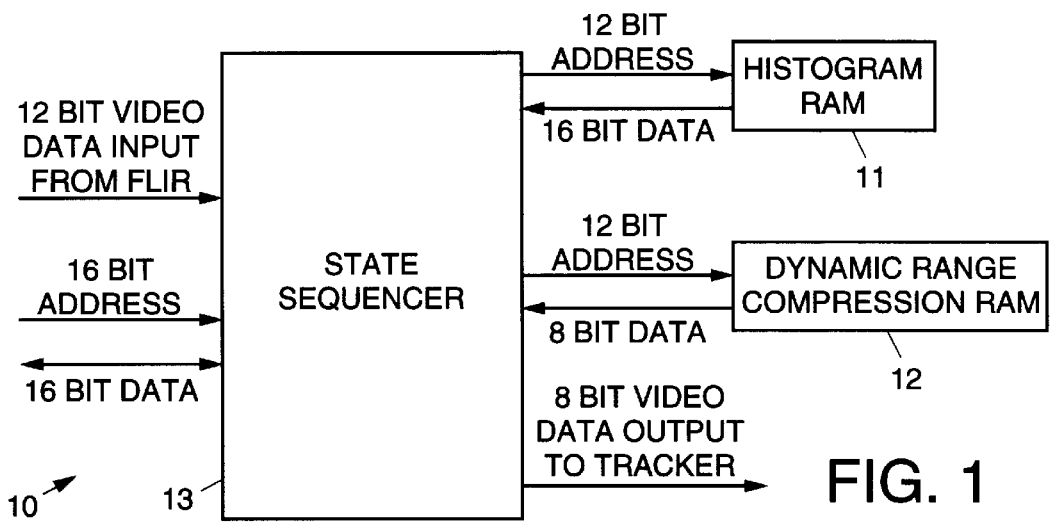
FIG. 1
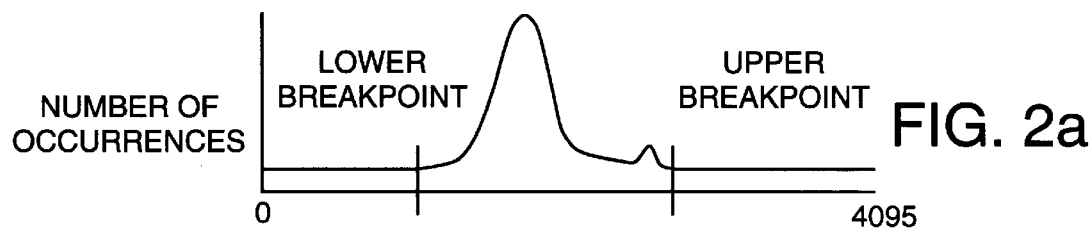
FIG. 2a
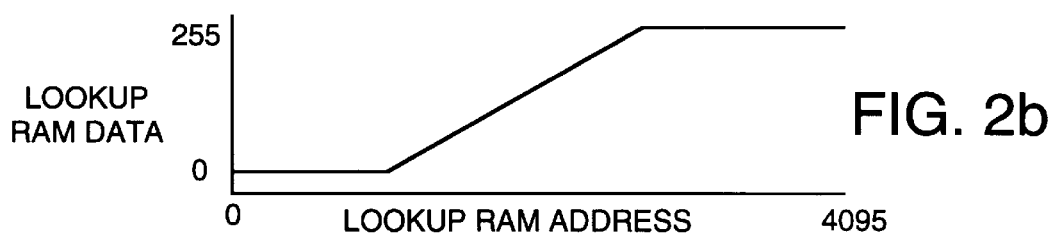
FIG. 2b
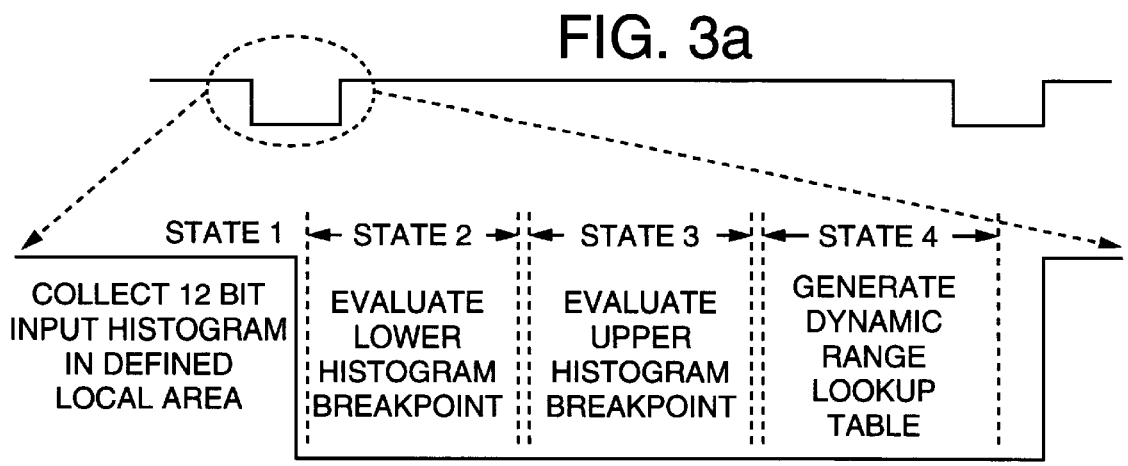
FIG. 3a
FIG. 3b

LOCAL AREA LINEAR DYNAMIC RANGE COMPRESSION

BACKGROUND

The present invention relates generally to video signal processors, and more particularly, to a local area linear dynamic range compression processor for use with such video signal processors.

Currently available high dynamic range sensors or imaging systems, such as forward looking infrared (FLIR) imaging systems, and the like generate high resolution video at a higher dynamic range (12 bits for example) compared to signal processors that process the video derived therefrom (8 bits for example). Consequently, it is necessary to compress the dynamic range of the video signals output by the imaging system before it is processed by the signal processor. Conventional approaches for compressing the dynamic range of the video signals typically used a very high speed signal processor that typically included a microprocessor, related support circuitry, and software to analyze an input data histogram of the video signals in order to generate dynamic range lookup table data that is used to compress the dynamic range of the video signals. The very high speed microprocessor-based signal processor is expensive to implement.

Accordingly, it is an objective of the present invention to provide for a local area linear dynamic range compression processor for use with video signal processors that eliminates the need for a very high speed microprocessor-based signal processor to achieve dynamic range compression of video signals.

SUMMARY OF THE INVENTION

To meet the above and other objectives, the present invention is a 12 bit to 8 bit linear dynamic range compression engine or processor for compressing video data. The dynamic range compression engine may be used in a forward looking infrared (FLIR) imaging system, for example, that generates video data in 12 bit wide words (differential ECL), which data is processed by a target tracker, for example, that processes video data in 8 bit wide words (single ended TTL).

The present invention utilizes a lookup random access memory (RAM), or dynamic range compression RAM, to update the offset and compression terms of each field of video in real time (1 field delay). During the active video period of each field, a 12 bit histogram of video pixel values is collected for a specific area of interest. During the video scan retrace time, the histogram is evaluated and the offset and compression terms are computed. An algorithm is employed to generate one of 3840 (15 integer and 3825 non-integer) compression slopes. The compression slope is written into the lookup (dynamic range compression) RAM starting at the computed offset value and is applied to the next field of video. During the next field the input video data is applied to the lookup RAM address inputs. The data out of the RAM is the dynamic range compressed 8 bit video.

The present invention operates as follows. A 12 bit input video data histogram is collected using a software defined local area of interest. The local area histogram is evaluated and a new dynamic range is computed based on upper and lower breakpoints of the histogram. The histogram evaluation and dynamic range compensation is updated every 16.6 milliseconds. The dynamic range compensation has a one field lag from the histogram collection. The tracker performance is not degraded by dynamic range compensation. Automatic (real time) and manual modes are provided for the compression and offset terms.

The local area dynamic range compression engine has been designed to be part of a circuit card that interfaces between a 12 bit digital FLIR developed by the assignee of the present invention and a high performance 8 bit target tracker. The local area dynamic range compression engine provides an updated dynamic range compression slope during the scan retrace of each video field.

The local area dynamic range compression engine has no greater than a 5 video line pipeline delay between input video and output video. The present invention utilizes pixel averaging and line interpolation to reformat input video image from 742 pixels by 240 lines to 371 pixels by 480 lines. The present invention provides differential ECL to single ended TTL conversion of the 12 bit input video. The present invention provides 12 to 8 bit real time linear dynamic range compression with 12 bit resolution for both compression and offset terms. In the present invention, the single compression or offset step does not result in more then 1 count change in the output pixel value.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 shows a block diagram of a local area dynamic range compression engine or processor in accordance with the principles of the present invention;

FIGS. 2a and 2b show graphs of an input video histogram and output linear dynamic range projection implemented by the present invention;

FIGS. 3a and 3b illustrate field timing diagrams for the present invention;

DETAILED DESCRIPTION

Figure 4:
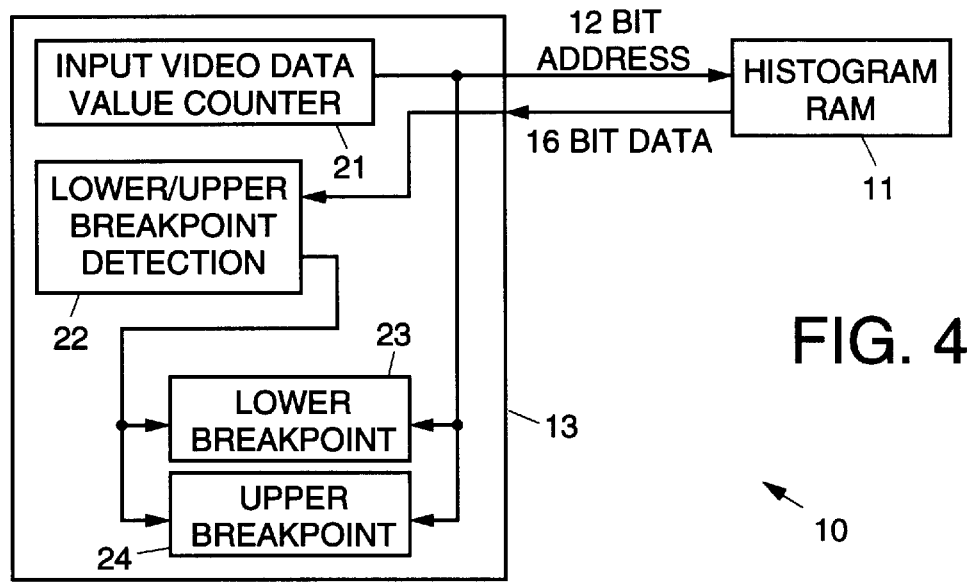
FIG. 4 illustrates operation of the present invention during STATE 1 shown in FIG. 2b.

Referring to the drawing figures, FIG. 1 is a block diagram of a local area dynamic range compression engine 10 or processor 10 in accordance with the principles of the present invention. The local area dynamic range compression engine 10 is comprised of a video lookup table random access memory (RAM) 11, or dynamic range compression RAM 11, which may have a size of 4K bits by 8 bits, and a video histogram RAM 12, which may have a size of 4K bits by 16 bits. A hardware state sequencer 13 that may be programmed into a Xilinx fully programmable gate array 14, for example, is coupled to the dynamic range compression RAM 11 and video histogram RAM 12. The local area dynamic range compression engine 10 implements real time histogram evaluation and lookup table generation within the confines of a relatively small printed wiring board area while using a relatively low amount of power. FIGS. 2a and 2b show graphs of an input video histogram and output linear dynamic range projection implemented by the dynamic range compression engine 10. The present invention may be used as part of a forward looking infrared (FLIR) imaging system, for example. The FLIR system interfaces to a target tracker that is used to process the video output of the FLIR system.

A functional description of the local area dynamic range compression engine 10 is presented below. During an active video period (STATE 1), the local area dynamic range compression engine state sequencer 13 (fully programmable gate array 14), is programmed to perform four distinct functions during the video field. Field timing for the dynamic range compression engine 10 is illustrated in FIGS. 3a and 3b. FIG. 4 illustrates the functioning of the dynamic range compression engine 10 during the active video period (STATE 1). The 12 bit video data, such as 12 bit FLIR video data, for example, is directed to the address of the histogram RAM 13 and the dynamic range lookup RAM 11.

The histogram RAM 12, which has been reset during STATE 4 of a previous field, is configured to collect a histogram of the 12 bit video data. When the pixels that have been identified as the local area are output from the FLIR imaging system, for example, the histogram function is enabled. The data that is read from the histogram RAM 12 is incremented and written back to the histogram RAM 12 at the same address. At the end of the active video period, the histogram RAM 12 contains a histogram of the 12 bit video that resides in the defined local area. The histogram contains the number of occurrences of each pixel, as is shown in FIG. 2a.

The dynamic range lookup RAM 11 contains a linear slope that was generated during STATE 4 of the previous field. The offset and compressed 8 bit video that results from addressing the lookup RAM 11 is directed to the 8 bit target tracker, for example.

Figure 5:
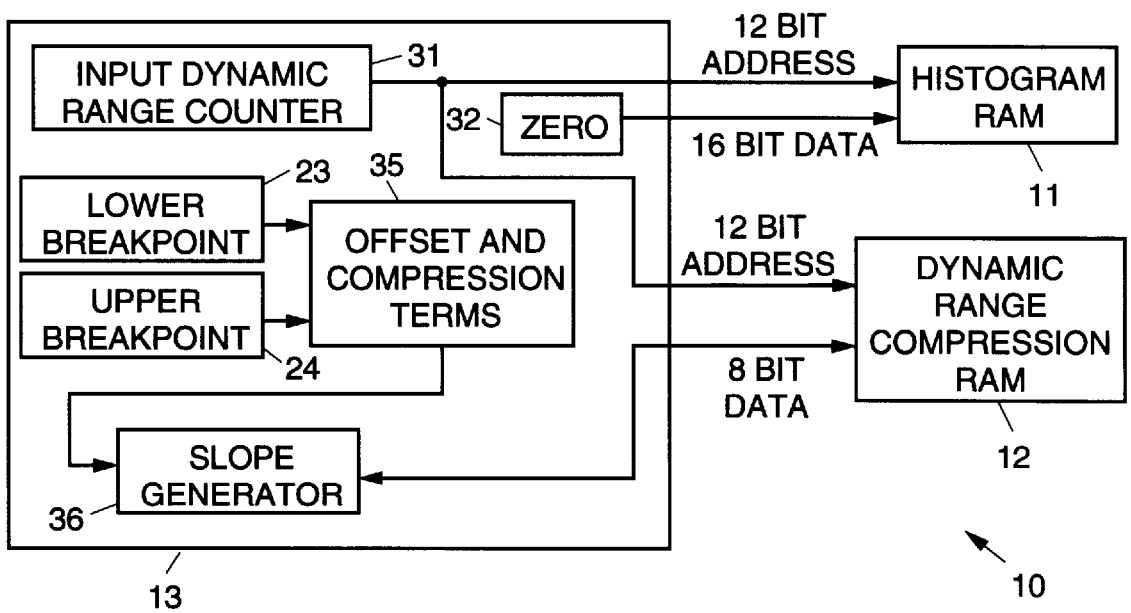
FIG. 5 shows the histogram evaluation process during STATE 2 and STATE 3 shown in FIG. 2b.

A histogram evaluation period is provided during STATE 2 and STATE 3. The purpose of the histogram evaluation period is to determine lower and upper breakpoints 23, 24 of the local area histogram. The lower and upper breakpoints 23, 24 are determined by the first and last occupied histogram bins. FIG. 5 shows the histogram evaluation process performed by the dynamic range compression engine 10 during STATE 2 and STATE 3.

During STATE 2, an input video data value counter 21 is set to zero 32 and begins counting up. When the first occupied histogram bin is detected, the input video data value count is stored as the lower histogram breakpoint 23.

During STATE 3, the input video data value counter 21 is set to maximum (4095), and the input video data value counter 21 begins counting down. When the last occupied histogram bin is detected, the input video data value count is stored as the upper histogram breakpoint 24.

Figure 6:
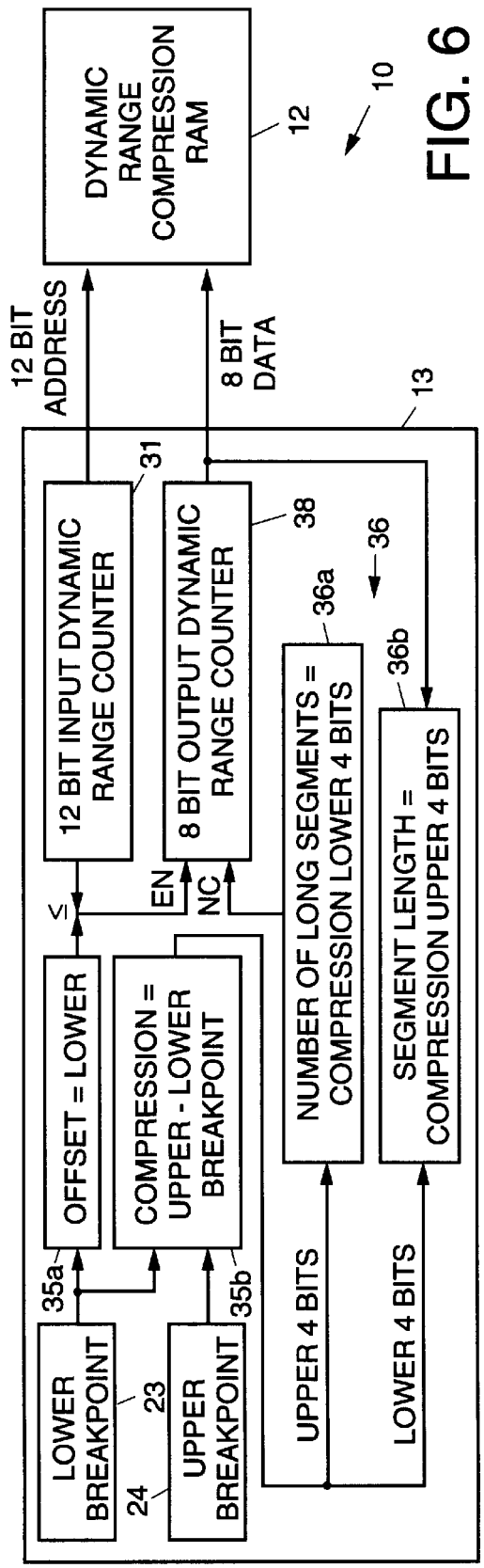
FIG. 6 illustrates the configuration of the state sequencer of the slope generation period during STATE 4 shown in FIG. 2b.

During the slope generation period (STATE 4), the state sequencer 13 is configured as shown in FIG. 6. The state sequencer 13 utilizes the lower and upper breakpoints 23, 24 of the local area histogram to establish 12 bit offset and compression terms 35a, 35b. A slope generator 36 uses the offset and compression terms 35a, 35b to determine the 8 bit lookup data to the dynamic range compression RAM 11. The histogram RAM 12 is reset for the next video field during this period.

The operation of the slope-generator 36 will be described with reference to FIG. 6. The dynamic range compression RAM 11 is addressed by the 12 bit input dynamic range counter 31. The 8 bit output dynamic range counter 38 supplies data to the dynamic range compression RAM 11. The 8 bit output dynamic range counter 31 is enabled when the input dynamic range counter 21 equals or is greater than the lower histogram breakpoint 23. A segment length counter 36a, 36b then starts counting down with each change in input dynamic range count. When the segment length counter 36a, 36b reaches zero the output dynamic range counter 38 increments and the segment length counter 36a, 36b is reloaded with the appropriate segment length. The output dynamic range counter 38 increments as each of the 256 segment lengths are reached.

The dynamic range compression slope is based on the local area histogram compression term (upper minus lower histogram breakpoints 24, 23). The dynamic range compression slope includes 256 segments, wherein each segment represents an output pixel value. The length of each segment determines the number of input pixel values to be mapped to an output pixel value. The angle of the slope is established by the segment length and determines the amount of the dynamic range compression.

Figure 7A:
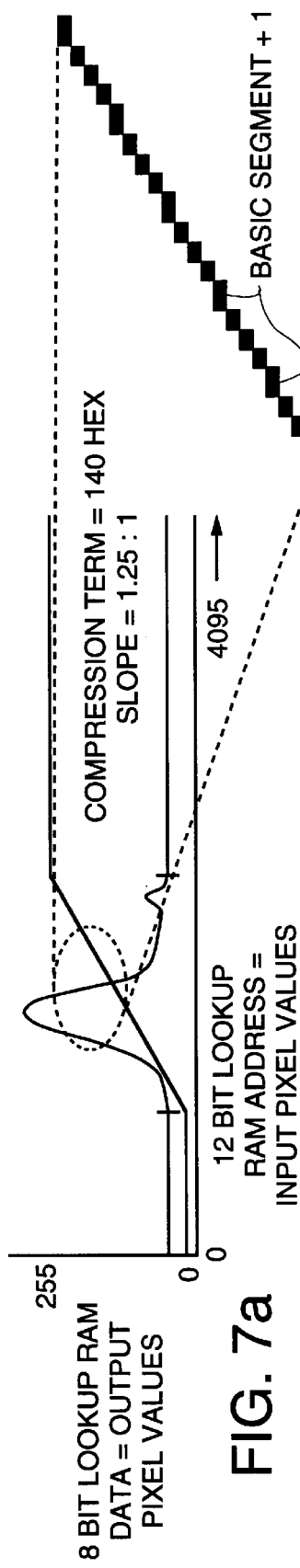
FIGS. 7a and 7b show two typical histograms and the resulting dynamic range projections, and wherein detailed areas show individual segments that make up the slope.
Figure 7B:
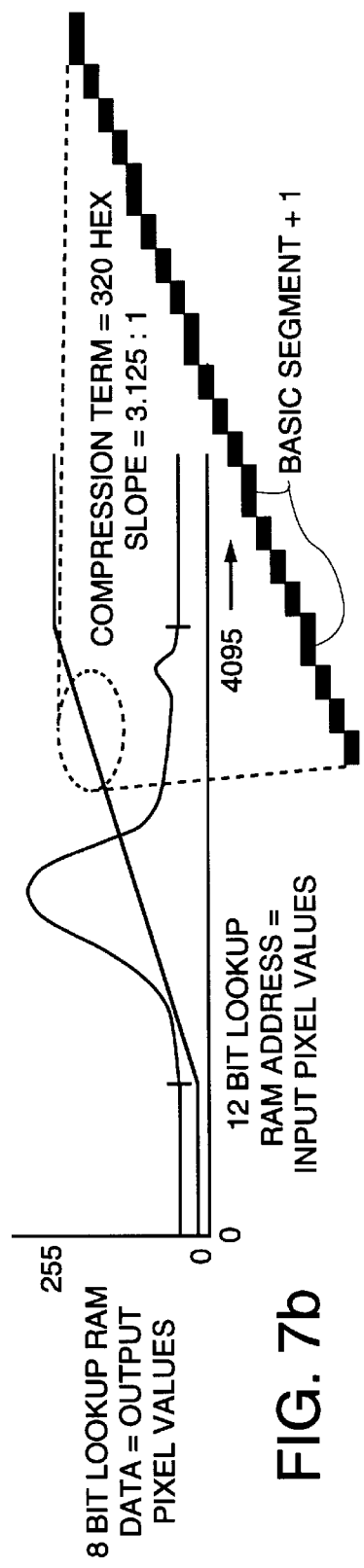

The upper 4 bits of the compression term determine the basic integer segment length. There are 3048 possible compression slopes, 15 are integer slopes (i.e., 1: 1, 2: 1, 3: 1, . . . 15: 1). Between each integer slope 255 non-integer slopes are possible. The lower 8 bits of the compression term determine the number and position of each lengthened segment and establishes the fractional portion of the slope. FIGS. 7a and 7b show two typical histograms and the resulting dynamic range projections, wherein the detailed areas show the individual segments that make up the slope.

Figure 8:
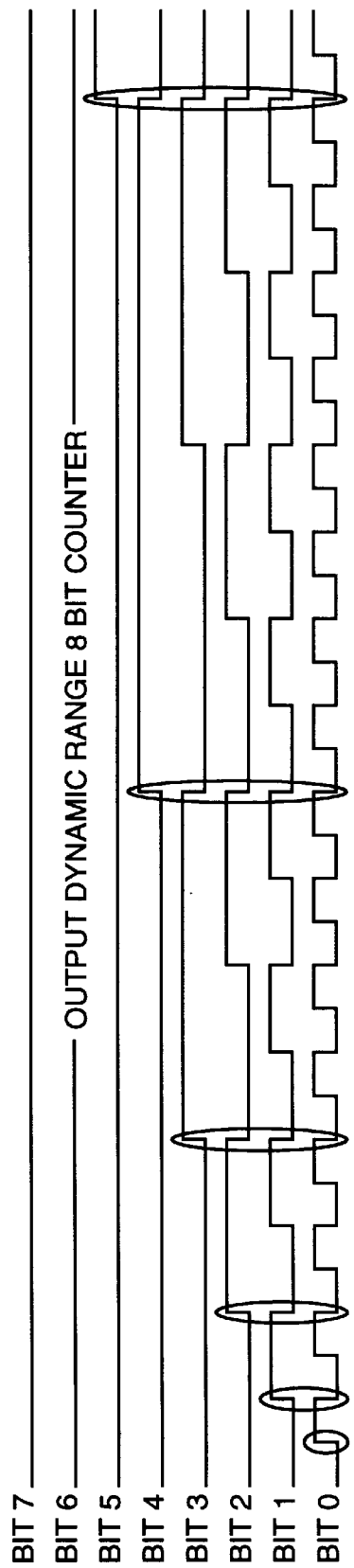
FIG. 8 illustrates the relationship between the output dynamic range counter and the lower 8 bits of the compression term.

The slope generator 36 uses the rising edges on each bit of the 8 bit output dynamic range counter 38 that occur at 255 unique times. By combining the output dynamic range counter 38 rising edges with the lower 8 bits of the compression term the required long segments can be evenly distributed along the slope. FIG. 8 illustrates the relationship between the output dynamic range counter 38 and the lower 8 bits of the compression term. In FIG. 8, bit 7=1 rising edge, bit 6=2 rising edges, bit 5=4 rising edges, bit 4=8 rising edges, bit 3=16 rising edges, bit 2=32 rising edges, bit 1=64 rising edges, and bit 0=128 rising edges.

The relationship is defined by the following logic: IF (compression term bit 0==1) THEN (output counter bit 7 provides 1 modified segment); IF (compression term bit 1==1) THEN (output counter bit 6 provides 2 modified segments); IF (compression term bit 2==1) THEN (output counter bit 5 provides 4 modified segments); IF (compression term bit 3==1) THEN (output counter bit 4 provides 8 modified segments); IF (compression term bit 4==1) THEN (output counter bit 3 provides 16 modified segments); IF (compression term bit 5==1) THEN (output counter bit 2 provides 32 modified segments); IF (compression term bit 6==1) THEN (output counter bit 1 provides 64 modified segments); and IF (compression term bit 7==1) THEN (output counter bit 0 provides 128 modified segments).

The performance requirements for the local area dynamic range compression engine 10 are for the most part qualitative. Because this system is designed to operate with an existing high performance 8 bit target tracker, no improvement in tracker performance was required from the local area dynamic range compression engine 10. Significant performance improvement was achieved for most target scenarios because of the increased signal to noise ratio supplied from the 12 bit FLIR. In worst case pathological target scenarios, no degradation in tracker performance was observed.

Thus, a local area linear dynamic range compression processor for use with video signal processors that eliminates the need for a very high speed signal processor to achieve dynamic range compression of video signals has been disclosed. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A local area linear dynamic range compression processor for processing video input data having a first word length and for generating video output data having a second word length, said processor comprising:

a dynamic range compression RAM;

a video histogram RAM; and a real-time state sequencer coupled to the dynamic range compression RAM and video histogram RAM, for receiving video input data having the first word length, for generating a histogram of the video input data for a predefined region of interest and for storing the histogram in the video histogram RAM, for determining upper and lower breakpoints of the histogram that correspond to predetermined occupied histogram bins, for computing a new dynamic range as a function of only the upper and lower breakpoints, for computing offset and compression terms and a single linear compression slope corresponding to the new dynamic range, and for writing the single linear compression slope into the dynamic range compression RAM starting at the computed offset value, which single linear compression slope is applied to the next field of video corresponding to the video output data.

2. The processor of claim 1 wherein the state sequencer is programmed into a fully programmable gate array.

3. The processor of claim 1 wherein the state sequencer has a video input coupled to a forward looking infrared (FLIR) imaging system for receiving video input data therefrom.

4. The processor of claim 3 wherein the state sequencer has a video output coupled to a target tracker for providing video output data thereto.

5. The processor of claim 1 wherein the state sequencer comprises:

an input dynamic range counter for addressing the dynamic range compression RAM, and for counting down from a predetermined value;

a segment length counter for counting down from a value corresponding to the segment length and which is enabled when the input dynamic range counter is greater than or equal to the lower histogram breakpoint; and an output dynamic range counter for supplying data to the dynamic range compression RAM and which is incremented when the segment length counter reaches zero.

6. The processor of claim 1 wherein the dynamic range compression slope is computed based on the compression term given by the upper histogram breakpoint minus the lower histogram breakpoint.

7. The processor of claim 1 wherein the dynamic range compression slope includes a plurality of segments, wherein each segment represents an output pixel value, and wherein the length of each segment determines the number of input pixel values to be mapped to an output pixel value, and wherein the angle of the slope is established by the segment length and determines the amount of the dynamic range compression.

8. The processor of claim 7 wherein the upper 4 bits of the compression term determine the integer segment length, and the lower 8 bits of the compression term determine the number and position of each lengthened segment and establishes the fractional portion of the slope.

9. The processor of claim 7 wherein the predetermined occupied histogram bins comprise the first and last occupied histogram bins.

10. A local area linear dynamic range compression processor for processing video input data having a ffirst word length and for generatin video output data having a second word length, said processor comprising:

a dynamic range compression RAM;

a video histogram RAM; and a state sequencer coupled to the dynamic range compression RAM and video histogram RAM, that comprises an input dynamic range counter for addressing the dynamic range compression RAM, and for counting down from a predetermined value, a segment length counter for counting down from a value corresponding to the segment length and which is enabled when the input dynamic range counter is greater than or equal to the lower histogram breakpoint, and an output dynamic range counter for supplying data to the dynamic range compression RAM and which is incremented when the segment length counter reaches zero, for receiving video input data having the first word length, for generating a histogram of the video input data for a predefined region of interest and for storing the histogram in the video histogram RAM, for determining upper and lower breakpoints of the histogram that corresponds to first and last occupied histogram bins, for computing a new dynamic range as a function of the upper and lower breakpoints, for computing offset and compression terms and a compression slope corresponding to the new dynamic range, and for writing the compression slope into the dynamic range compression RAM starting at the computed offset value, which compression slope is applied to a subsequent field of video corresponding to the video output data.

11. The processor of claim 10 wherein the state sequencer is programmed into a fully programmable gate array.

12. The processor of claim 10 wherein the state sequencer has a video input coupled to a forward looking infrared (FLIR) imaging system for receiving video input data therefrom.

13. The processor of claim 12 wherein the state sequencer has a video input coupled to a forward looking infrared (FLIR) imaging system for receiving video input data thereto.

14. The processor of claim 10 wherein the dynamic range compression slope is computed based on the compression term given by the upper histogram breakpoints minus the lower histogram breakpoint.

15. The processor of claim 10 wherein the dynamic range compression slope includes a plurality of segments, wherein each segment represents an output pixel value, and wherein the length of each segment determines the number of input pixel values to be mapped to an output pixel value, and wherein the angle of the slope is established by the segment length and determines the amount of the dynamic range compression.

16. The processor of claim 15 wherein the upper 4 bits of the compression term determine the basic integer segment length, and the lower 8 bits of the compression term determine the number and position of each lengthened segment and establishes the fractional portion of the slope.

* * * * *